INVENTOR
William D. Hershberger
BY J. L. Whittaker
ATTORNEY

Aug. 13, 1957 W. D. HERSHBERGER 2,802,943

AUTOMATIC ADJUSTMENT OF FREQUENCY STABILIZATION SYSTEMS

Filed July 16, 1949 3 Sheets-Sheet 2

INVENTOR
William D. Hershberger
BY J. L. Whittaker
ATTORNEY

Aug. 13, 1957 W. D. HERSHBERGER 2,802,943

AUTOMATIC ADJUSTMENT OF FREQUENCY STABILIZATION SYSTEMS

Filed July 16, 1949 3 Sheets-Sheet 3

INVENTOR
William D. Hershberger
BY J. L. Whittaker
ATTORNEY

United States Patent Office 2,802,943

Patented Aug. 13, 1957

2,802,943

AUTOMATIC ADJUSTMENT OF FREQUENCY STABILIZATION SYSTEMS

William D. Hershberger, Princeton, N. J., assignor to Radio Corporation of America, a corporation of Delaware Application July 16, 1949, Serial No. 105,246

8 Claims. (Cl. 250—36)

This invention relates to methods and systems for controlling oscillators, particularly search oscillators such as are employed for example in frequency-stabilization and in microwave spectroscopy.

In frequency-stabilization systems such as disclosed in my copending applications later herein referred to, the frequency of a search oscillator is repeatedly swept over a range of frequencies including the resonant frequency of a high Q circuit element such as a cavity or section of waveguide containing a molecularly resonant gas. For rigid control, the width of the sweep band should be narrow, for example, only about five times the width of the gas-absorption line selected as a frequency standard; however because of drift in the mean-frequency of the search oscillator during the "warm-up" or starting period, the presence of an operator was heretofore necessary to make, during that period, compensatory manual adjustment of the oscillator to insure that the relatively narrow sweep band continuously includes the standard frequency.

In accordance with one aspect of the present invention, during the "warm-up" period of the search oscillator, its sweep range is broad, for example, of the order of five to ten times its normal width, substantially to reduce the time required for the search oscillator to locate the frequency of the standard; but when the search oscillator locates the absorption line or resonant frequency of the selected standard, its mean-frequency is quickly centered on a frequency at least closely approximating the gas-line frequency, and the sweep range is more slowly reduced to its normal narrow value. Optimum performance is thus obtained without need for manual adjustment by an operator and it is feasible to utilize frequency-stabilization systems of the aforesaid type in unattended relay stations for automatic operation during periods which correspond with predetermined time schedules or which are initiated and terminated by control signals from a remote point.

Moreover, in systems of the aforesaid type, the output of the oscillator to be stabilized is mixed with the output of the search oscillator to produce two side-bands, only a particular one of which, in normal operation, sweeps over a predetermined fixed frequency, but both of which during the "warm-up" period may at different times sweep over a preselected fixed frequency with consequent possibility of stabilization at the wrong oscillator frequency.

In accordance with another aspect of the present invention, the stabilizing system which normally controls the frequency of the oscillator to be stabilized is suppressed except when the proper side-band sweeps over the aforesaid fixed predetermined frequency; more particularly, the output of the oscillator to be stabilized is impressed upon a circuit or network which is broadly resonant at the desired operating frequency, and the output of that circuit or network is utilized to suppress the normal gain of the stabilizing feedback circuit or system when the operating frequency of the oscillator is in a range corresponding with the undesired side-band.

The invention further resides in methods and systems having novel and useful features herein described and claimed.

For an understanding of my invention and for illustration of arrangements embodying it, reference is made to the accompanying drawings, in which.

Figures 1, 6:
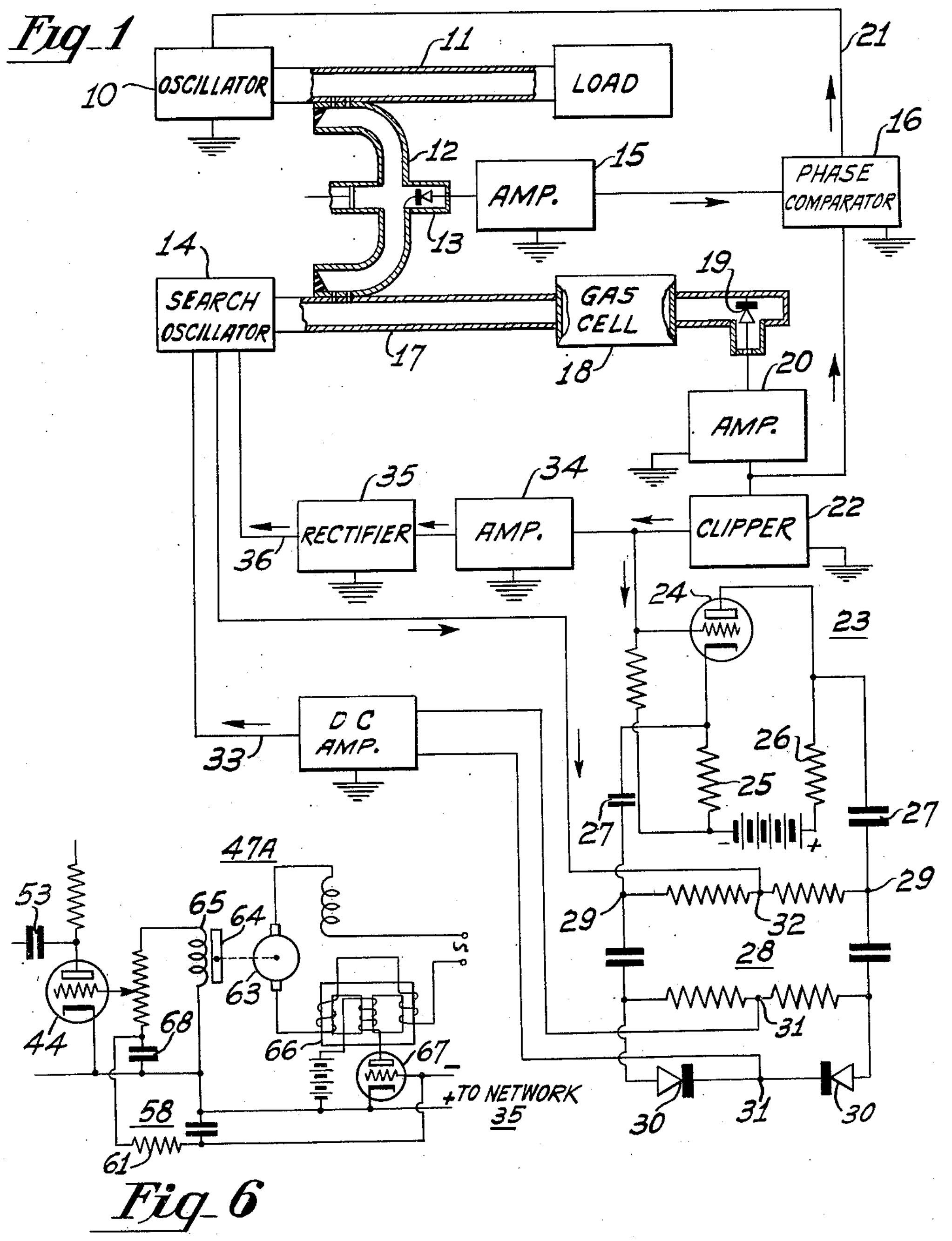
Fig. 1 is a block diagram of a frequency-stabilization system embodying the invention.
Fig. 6 is an alternative form of sweep generator utilizable in the systems of Figs. 1 and 5.

Referring to Fig. 1, the output of oscillator 10 whose frequency is to be stabilized is impressed, as by transmission line 11 and directional coupler 12, upon a mixer 13. Upon the mixer is also impressed the output of a frequency-modulated search oscillator 14, the output of the mixer therefore comprising a beat-frequency varying at the repetition rate or modulation-frequency of the search oscillator 14. The output of the mixer 13 is impressed upon a network 15, later more specifically identified, to produce a series of pulses each occurring as the beat-frequency passes through a predetermined fixed value. The output of network 15 is impressed upon one input circuit of a phase-comparator or coincidence detector 16.

The output of the search oscillator 14 is also impressed as by transmission line 17 upon a high Q frequency standard 18 which may be a cavity or length of waveguide containing a molecularly resonant gas. The transmission lines 11 and 17 may, for microwave frequencies, be concentric lines or waveguides.

In normal operation of the system, the range of frequencies swept by the search oscillator 14 includes a gas-absorption line, and accordingly the output energy of the gas-cell 18 sharply decreases in each cycle of the modulating-frequency of the search oscillator. The output of the gas-cell as rectified by rectifier 19, which may be a crystal or a diode, is therefore a series of sharp pulses each occurring as the frequency of the modulated oscillator 14 sweeps through the gas-absorption line. These pulses, after amplification by amplifier 20, are impressed upon a second input circuit of the phase-comparator 16. The unidirectional output voltage of the phase-comparator 16 which varies in sense and magnitude with change of the phase relation of the two series of pulses is applied, as by control line 21, to oscillator 10 closely to regulate its frequency.

Fig. 1 as thus far described is similar to the frequency-stabilizing systems disclosed in my copending applications Serial No. 4,497 filed January 27, 1948, now Patent No. 2,702,351, Serial No. 73,626 filed January 29, 1949, now Patent No. 2,712,070, Serial No. 68,648 filed December 31, 1948, now Patent No. 2,663,798, Serial No. 58,296 filed November 4, 1948, now Patent No. 2,555,131 issued May 29, 1951, and Serial No. 62,626 filed November 30, 1948, now Patent No. 2,591,257, to which reference may be made for further description and more detailed showing of the circuit components.

Figures 2A, 2B, 2C, 2D:
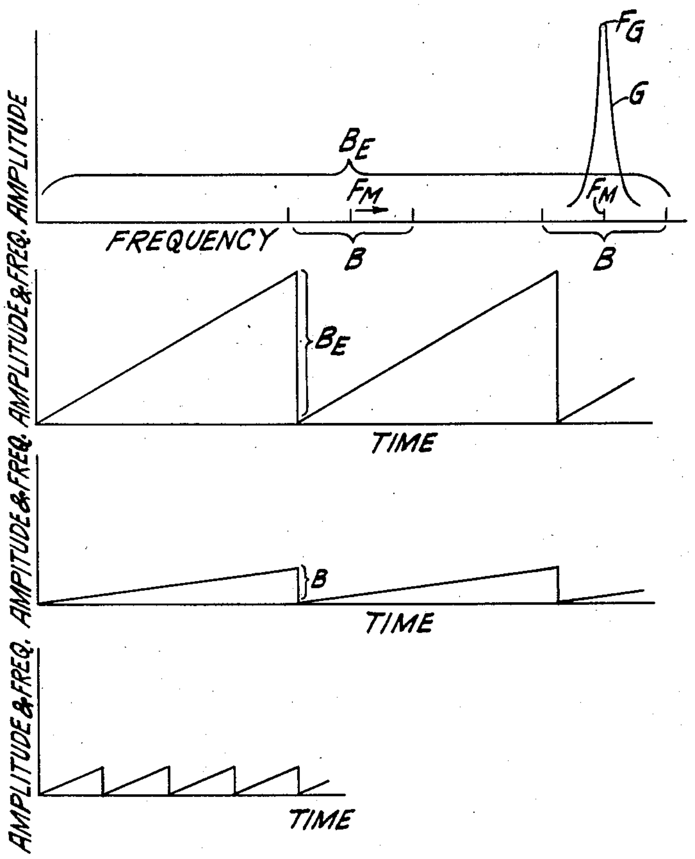
Figs. 2A–2B are explanatory figures referred to in discussion of the sweep-range control of Fig. 1.
Figs. 2C and 2D are explanatory graphs referring to the discussion of the structure described by reference to Fig. 5.

In normal operation of such systems, the width of the band of frequencies B, Fig. 2A, swept by the search oscillator 14 is relatively narrow, for example, about five or six times the width of the swept gas line represented on exaggerated scale in Fig. 2A by curve G. Also under normal conditions, the mean-frequency $F_M$ of the search oscillator is centered on the resonant frequency $F_G$ of the gas. The width of the sweep band is relatively narrow, for example, 2 megacycles and the reptition rate of the sweep quite high, for example, 50 kilocycles, to insure rigidity of the frequency-stabilization of oscillator 10. As the drift in frequency of the search oscillator during its "warm-up" or starting period is many times greater than the width of the optimum sweep-band B, it was necessary with the arrangements described manually to adjust the mean-frequency of the search oscillator 14 during the "warm-up" or starting period, of say one-half hour or so, as otherwise the range of frequencies swept by oscillator 14 would not include the resonant frequency of the standard 18. Such adjustments were also necessary in systems in which the mean-frequency of the search oscillator drifted away from the gas-absorption line to such extent the sweep-band B no longer included the gas line.

It is a purpose of the present invention to eliminate the need for such manual resetting of the search oscillator 14 and yet attain adjustments which result in optimum operating performance.

In accordance with the present invention, the oscillator 14 is so constructed or adjusted that its mean-operating-frequency at the beginning of a "warm-up" period is substantially different from the resonant frequency of the standard 18 but drifts toward the standard frequency during that period, generally as indicated by the arrow in Fig. 2A. So far as the invention is concerned, it is immaterial whether the mean-frequency $F_M$ starts above the standard frequency and drifts downwardly toward it, or vice versa. Also, as indicated in Fig. 2A, the normal sweep range B is so narrow that at least for a substantial part of the "warm-up" period, the gas-line frequency $F_G$ is outside of the sweep band. To shorten the time in the "warm-up" period for production of reference pulses by gas-cell 18 and demodulator 19, it is provided in accordance with the present invention that at initiation of operation of the search oscillator 14 the width of the band of frequencies swept by the oscillator shall be many times greater than the normal band-width B; specifically, the band-width $B_E$, Fig. 2A, at the beginning of the "warm-up" period may be twenty or thirty times the width of the gas-absorption line G, Fig. 2A. It is thus insured that demodulator 19 is effective early in the "warm-up" period to produce pulses which in accordance with the present invention are utilized to center the mean-frequency of the search oscillator 14 with respect to the standard frequency $F_G$. It is also provided in accordance with the present invention that these pulses shall reduce the width of the sweep band during the "warm-up" period, but only to extent sufficient to insure there is included within it the resonant frequency $F_G$. These pulses may also be used to increase the sweep rate concurrently with reduction in width of the sweep band.

Figure 5:
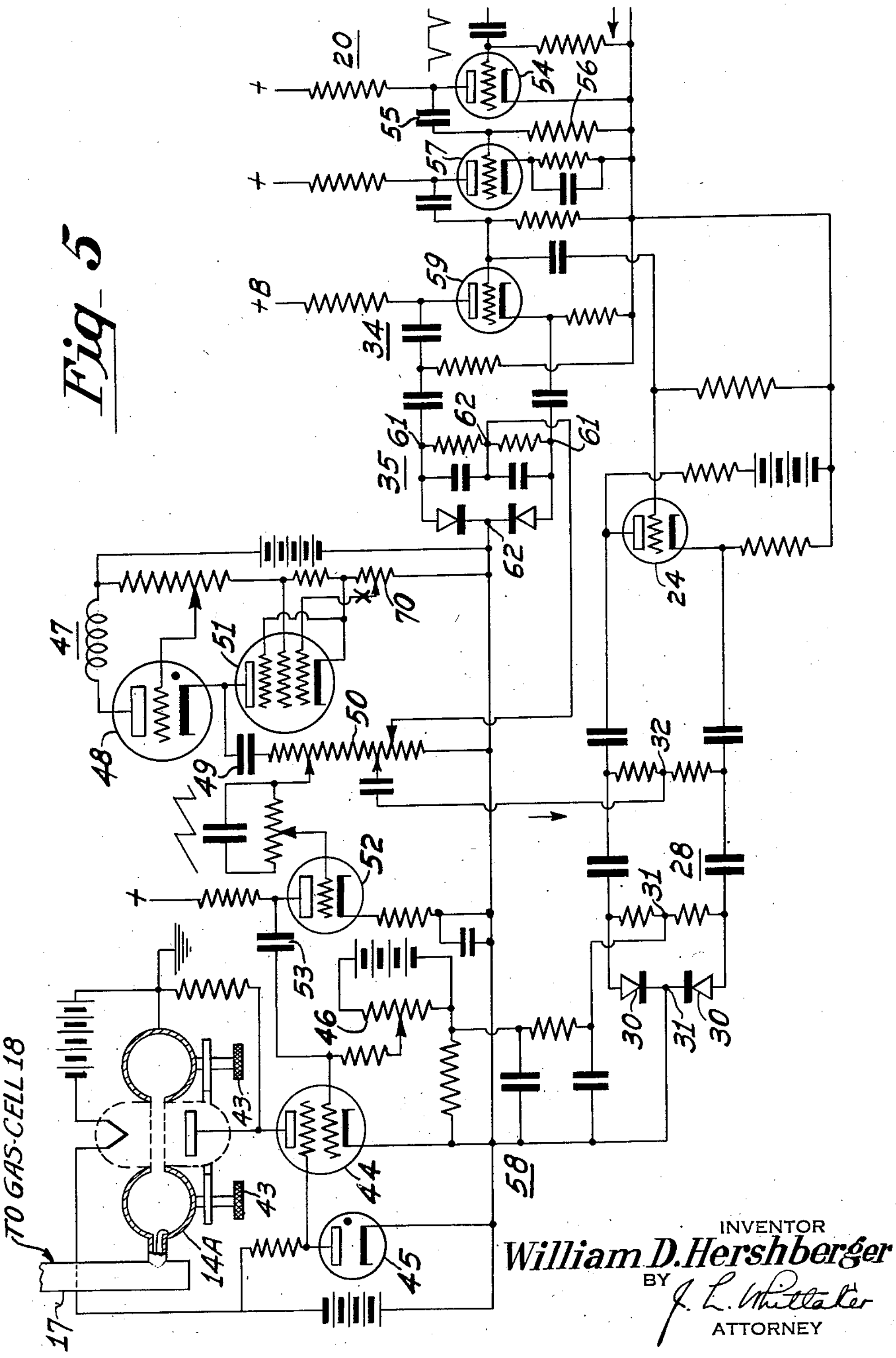
Fig. 5 is a schematic circuit diagram of a specific form of control circuit utilizable in the system of Fig. 1.

In the system shown in Fig. 1, the control of the mean-frequency of search oscillator 14 is effected by impressing the output of amplifier or receiver 20 upon a differential-clipper network 22, one form of which is later described, to produce sharpened pulses which are impressed upon an inverter-converter network 23, which in the form shown in Fig. 1 includes an electronic tube 24 having substantially equal resistances 25 and 26 respectively disposed in its cathode and anode circuits. There are thus produced pairs of pulses, the pulses of each pair being coincident in time but of opposite polarity. These pairs of pulses may be applied, as through blocking condensers 27—27, to the input terminals 29—29 of a phase-comparator or coincidence detector 28 of known type. Upon input terminal 32 of this same network is also impressed a series of impulses having the same repetition rate as the modulating-frequency of the search oscillator and having fixed phase relation with respect thereto. The rectifiers 30, 30 of network 28 are therefore effective to produce between the output terminals 31, 31 a unidirectional voltage which varies in sense and magnitude with changes in the phase relation between the reference pulses applied to input terminal 32 and the pairs of pulses applied to input terminals 29. The output voltage of the phase-comparator 28 is applied by control line 33 to regulate the mean-frequency of the search oscillator in suitable manner, for example as shown in Fig. 5, later described.

The pulse output of gas-cell 18 is also used to control the sweep range of the search oscillator 14. The output of the gas-cell, as demodulated by rectifier 19 or by a separate rectifier, is impressed upon amplifier-rectifier network 34, 35 to produce a unidirectional control voltage applied by line 36 to change the sweep rate of oscillator 14. When, as during the early stages of the "warm-up" period the standard frequency $F_G$ is outside of the range of frequencies swept by oscillator 14, the sweep range $B_E$ of oscillator 14 is very wide, Fig. 2B, but as the mean-frequency of the oscillator 14 drifts towards the standard frequency $F_G$, the sweep band includes the absorption line of the gas from cell 18 and there is produced by rectifier 35 a voltage which reduces the sweep range until, as in Fig. 2C, it resumes its normal width B.

The time constant of the range control circuit including components 34, 35 is slow compared to the time constant of the frequency-centering network including components 23, 28, and accordingly once the gas line G comes within the sweep range of the oscillator, the mean-frequency of the oscillator 14, under control of the detector 28, is quickly shifted toward centered relation with respect to the gas line and the width of the sweep range is gradually narrowed to its normal width B. These relations are shown in the right-hand portion of Fig. 2A.

Thus, without need for any attention on the part of an operator to correct for drift of the search oscillator, the frequency-stabilizing system is effective shortly after initiation of operation and within an interval short compared to the "warm-up" period. This is particularly of importance when the oscillator 10 is located in an unattended relay station for transmission of broadcast or television programs, or for point-to-point communication under control of a time clock, or in response to control signals from a remote point.

As more fully discussed in my aforesaid applications, the frequency of oscillator 10 is stabilized at a frequency $F_O$ which corresponds with the standard frequency $F_G$ plus or minus a fixed frequency F dependent upon the constants of network 15. When that network is a narrow band-pass filter, the fixed frequency F is the pass-frequency as in my application Serial No. 4,497. When the network 15 includes a discriminator as in my application, Serial No. 68,648, the fixed frequency F is the null output frequency of the discriminator; when the network 15, as in my application Serial No. 73,626, includes a differentiating circuit, the fixed frequency F corresponds with the point of maximum slope of the differentiator output. In brief, the stabilized frequency $$F_O=\frac{F_G\pm F}{n} \quad (1)$$

where $n$ is an integer.

In the particular system shown in Fig. 1, the factor $n$ is unity, although as discussed in my copending application Serial No. 4,497, it may be of different value.

As appears from Eq. 1 above, the frequency of oscillator 10 may be stabilized at either of two frequencies corresponding respectively with the upper and lower side-bands. If the frequency of oscillator 10 at the beginning of the "warm-up" period is higher than the gas-line frequency $F_G$ and the desired operating frequency of the oscillator corresponds with the upper side-band, there is the possibility that the oscillator will be stabilized at the wrong frequency; this same possibility exists if oscillator 10 is constructed or adjusted so that it drifts upwardly in frequency during the "warm-up" period toward the gas-line frequency and stabilization is desired at a frequency corresponding with the lower side-band frequency; this possibility also arises regardless of the direction of drift of oscillator 10 and regardless of whether upper or lower side-band stabilization is desired, if the operating frequency passes through its desired normal value before the search oscillator locates the gas line.

Figure 4A:
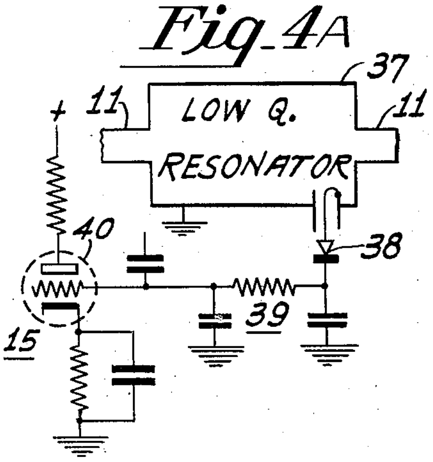
Figs. 4A–4B illustrate arrangements alternatively utilizable in the system of Fig. 1 to prevent stabilization on the improper side-band.

To insure stabilization at only the desired one of the two possible frequencies, the output of oscillator 10 may, as in Fig. 4A, be impressed upon a low Q cavity 37 which is broadly resonant at the desired operating frequency and the output of the cavity 37 is rectified by demodulator 38 to provide a control voltage which renders the frequency-stabilizing system for oscillator 10 inoperative except when it is suitably close to the frequency of maximum output of the cavity 37. The control voltage produced by rectifier 38 may be utilized in any known way to suppress the control of the effectiveness of the negative feedback loop including phase-comparator 16; in the particular arrangement shown in Fig. 4A, this voltage is applied through smoothing filter 39 as a gain-control voltage for one or more tubes 40 included in network 15.

Figure 3:
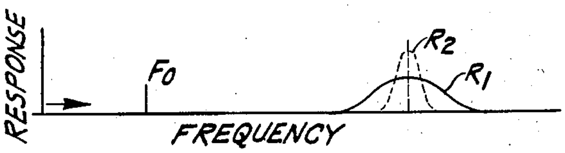
Fig. 3 is an explanatory figure referred to in discussion of Figs. 4A and 4B.

With null or low output of rectifier 38, one or more stages of network 15 is effectively blocked and accordingly the frequency-stabilizing loop for oscillator 10 is inoperative. However, when the operating-frequency of oscillator 10 is within the range corresponding with the selected side-band frequency F (Eq. 1), the control voltage derived by rectifier 38 from the low Q cavity 37 is effective to restore network 15 to normal operating condition. It is thus insured that the oscillator frequency $F_O$ shall be stabilized only at $(F_G+F)$ or at $(F_G-F)$. Referring to Fig. 3, for example, the frequency stabilization of oscillator 10 does not occur until the frequency $F_O$ drifts within the broad resonance characteristic $R_1$ of the low Q feed-through cavity 37.

Figure 4B:
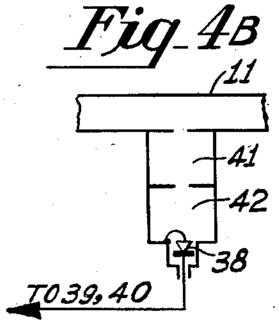

Alternatively, the suspended operation of the frequency-stabilizing system for oscillator 10 may be effected by a pair of high Q, over-coupled resonant cavities 41, 42 (Fig. 4B) jointly having a flat top resonance characteristic $R_2$ (Fig. 3). As in Fig. 4A, the output of rectifier 38 is effective to unblock one or more stages of amplifier network 15 only when the operating frequency $F_O$ of oscillator 10 is within the range defined by curve $R_2$, which range is sufficiently narrow to exclude the possibility of stabilization at the undesired side-band frequency of Eq. 1.

As a specific example of a circuit arrangement for centering the frequency of a search oscillator on a gas line and for reducing the sweep band of the generator when it locates the gas line, reference is made to Fig. 5. Although the search oscillator 14A may be of other types, it is shown in Fig. 5 as a reflex klystron whose mean-frequency can be manually set by adjusting screws 43 to any of different frequencies within a substantial range. The mean-frequency of klystron 14A may also be varied by varying the potential of the reflex anode, which potential in the particular arrangement shown in Fig. 5 is variable by adjustment of the bias applied to a control tube 44, preferably a screen grid tube whose screen grid potential is held constant by a voltage regulator tube 45. The voltage drop through tube 44 and therefore the potential of the anode of the klystron may be varied by adjustment of potentiometer 46 in the control grid circuit of the tube 44. The potential of the control grid is also automatically variable under control of the phase-detector 28 for centering of the mean-frequency of the oscillator with respect to gas-absorption line, as discussed in connection with Fig. 1.

The internal resistance of tube 44 is also periodically varied by the output of a sweep generator for frequency-modulation of the klystron 14A. In the particular arrangement shown in Fig. 5, the sweep generator 47 comprises a known type relaxation oscillator tube 48 which effects periodic charge and discharge of condenser 49 through a resistor 50. The magnitude of the charging current is controlled by tube 51 and the sweep rate or modulating-frequency may be varied by adjustment of potentiometer 70. The waveform of the particular sweep generator shown is of sawtooth shape, Figs. 2B–2D, although it will be understood that the generator may be of a type whose output waveform is double sawtoothed, triangular, or other desired shape. The output of the sweep generator 47, amplified by tube 52, is impressed by a suitable coupling means, exemplified by condenser 53, upon the control grid circuit of the frequency control tube 44.

Under the circumstance that the gas-line has not been located by the search oscillator, the gain of tube 52 is high and the frequency of oscillator 14A is therefore swept through a wide range $B_E$, Figs. 2A, 2B. However, when the gas-line has been located, i. e. when swept by the output of oscillator 14A, the gain of tube 52 is reduced, as later herein described, so that the sweep voltage as applied to control tube 44 is reduced to much lower magnitude B, Figs. 2A, 2C and the sweep range of oscillator 14A is correspondingly narrowed.

To derive the range-control voltage from the output of gas-cell 18, the output of the final tube 54 of amplifier 20 may be impressed upon a differentiating network including condenser 55 and resistor 56 (Fig. 5) and the output of the differentiator network impressed upon a clipper tube 57. The clipped, differentiated pulses, preferably after amplification by amplifier 59, are impressed upon the input terminals 61 of a rectifier network 35 of any suitable known type. The unidirectional potential developed across the output terminals 62, 62 of network 35 is applied to the control grid of tube 52 with polarity which reduces the gain of the tube and so reduces the modulating-voltage for the oscillator 14A. This same voltage or a voltage similarly derived may be applied to the control grid of tube 51 concurrently to increase the sweep rate frequency, Fig. 2D. The differentiating, clipping network 55, 56, 57 may be used, as shown in Fig. 5, to shape the output of amplifier 20 for application to the centering-control network 28 of the search oscillator system.

As shown in Fig. 6, the sweep voltage applied to control tube 44 of search oscillator 14A may be produced by a known mechanical type of sweep generator 47A. Specifically, the motor 63 rotates a suitably shaped permanent magnet 64 with respect to a pickup coil 65 to induce the sweep voltage which is applied to the grid of tube 44. The motor-energizing circuit includes a saturable core reactor 66 whose control winding is energized by the anode current of a tube 67. The current through the control winding and therefore the speed of motor 63 is determined by the potential of the control grid of tube 67, which is determined by the output voltage of rectifier 35 (Fig. 5). Until the search oscillator 14A locates the gas-absorption line, the search oscillator sweeps over a wide range of frequencies at low rate corresponding with the then slow speed of motor 63. However, when the search range sweeps through a gas line, the output of network 35 is applied to tube 44 to reduce the search range and is applied to tube 67 to increase the search rate by increase of the speed of motor 63.

The search oscillator control systems shown in Figs. 5 and 6 are particularly suited for use in frequency-stabilizing systems of the type exemplified in Fig. 1 and in my aforesaid copending applications but may also be used to advantage in microwave spectroscopy, for example, in systems such as disclosed in my copending applications Serial No. 596,242 filed May 28, 1945 and Serial No. 105,245 filed July 16, 1949. In such systems, for analysis of a gas, the frequency of oscillator 14A may be coarsely manually adjusted, as by adjusting screws 43 of potentiometer 46, approximately to the frequency of the gas line whereupon the automatic control systems for adjusting the mean-frequency of a search oscillator and its sweep range will automatically control the oscillator to locate the gas line and to center the mean-frequency of the oscillator upon it.

I claim:

1. A system comprising a gas cell, a microwave oscillator for impressing microwave energy on said cell, means for frequency-modulating said microwave energy over a range of adjustable width, means including a demodulator of the microwave energy unabsorbed by gas in said cell for controlling the width of said range, and means for controlling the mean-frequency of said oscillator comprising a phase-comparator responsive to variations of the phase relation between the modulating frequency and the modulating-frequency component of the output of said demodulator.

2. A system comprising a cell containing gas exhibiting molecular resonance, a frequency-modulated oscillator for impressing microwave energy upon said gas-cell characterized by drift of frequency toward a molecular resonance frequency of said gas, detection means responsive to change in absorption of said microwave energy by said gas for providing a control effect, and means for utilizing said effect for varying the width of the frequency band swept by said oscillator.

3. A system comprising an oscillator whose frequency drifts toward the desired operating frequency during a "warm-up" period, means for stabilizing the frequency of said oscillator including a frequency standard, a frequency-modulated oscillator whose output is applied to said standard and means for mixing the outputs of said oscillators to produce upper and lower side bands, and means for disabling said frequency-stabilizing means when and only when a selected one of said side bands excludes a frequency corresponding with said desired operating frequency, said disabling means including frequency selective means energized from the output of said first-named oscillator and a gain control voltage means coupled to said frequency selective means the gain control voltage of which is applied to said stabilizing means.

4. A system comprising an oscillator whose frequency drifts toward the desired operating frequency during a "warm-up" period, means for stabilizing the frequency of said oscillator including a frequency standard, a frequency-modulated oscillator whose mean-frequency drifts toward the frequency of said standard, and means for mixing the outputs of said oscillators to produce upper and lower side bands both of which at different times in the "warm-up" period include a predetermined frequency corresponding with said desired operating frequency, means for disabling said frequency-stabilizing means except when a selected one of said side bands includes said predetermined frequency, means for broadening the sweep-range of said frequency-modulated oscillator during the "warm-up" period, and means responsive to the output of said frequency standard for reducing said sweep range when it includes the frequency of said standard.

5. A system comprising an oscillator whose frequency during a "warm-up" period drifts toward the desired operating frequency, a frequency standard, a frequency-modulated search oscillator whose mean-frequency during the "warm-up" period drifts toward the frequency of said standard, means coupled to said search oscillator effective when the standard frequency is within the sweep range of said search oscillator for centering the mean frequency thereof with respect to the standard frequency, means for mixing the outputs of said oscillators to produce upper and lower side bands both of which at different times in the "warm-up" period include a predetermined frequency corresponding with said desired operating frequency, means including said search oscillator and said frequency standard for stabilizing said first oscillator for operation at a frequency corresponding with the algebraic sum of said standard frequency and said predetermined frequency, and means for disabling said frequency-stabilizing means except when said predetermined frequency is within a selected one of said side bands.

6. A system comprising an oscillator whose frequency during a "warm-up" period drifts toward the desired operating frequency thereof, a frequency standard, a frequency-modulated search oscillator whose mean-frequency during the "warm-up" period drifts toward the frequency of said standard, means coupled to said search oscillator effective when the standard frequency is within the sweep range of said search oscillator for then centering the mean-frequency thereof with respect to the standard frequency and means coupled to said search oscillator for then narrowing the sweep range, means for mixing the outputs of said oscillator to produce upper and lower side bands, both of which during the "warm-up" period include a predetermined frequency corresponding with the desired operating frequency, means including said search oscillator and said frequency standard for stabilizing said first oscillator at a frequency corresponding with said standard frequency plus or minus said predetermined frequency, and means for disabling said frequency-stabilizing means until said predetermined frequency is within a selected one of said side bands.

7. A system for locating an absorption line of a gas which comprises means for generating and impressing frequency-modulated microwave energy upon the gas, means for slowly varying the mean-frequency of said energy while sweeping a wide band of frequencies until there is absorption of energy by the gas, means for utilizing the reduction in unabsorbed energy rapidly to shift the mean-frequency of said energy toward the frequency at which maximum absorption occurs, and means for utilizing the reduction in unabsorbed energy less rapidly to reduce the width of said band of frequencies until for a minimum band width there is maximum absorption corresponding with centering of the mean-frequency on the gas-absorption line.

8. A system for stabilizing the operating frequency of a microwave oscillator subject to drift during a "warm-up" period which comprises a frequency-modulated search oscillator, means for mixing the outputs of said oscillator and said frequency-modulated search oscillator to produce a varying beat-frequency, means for producing a series of pulses each occurring as said beat-frequency passes through a predetermined frequency, a molecularly resonant gas, means for impressing the output of the search oscillator upon said molecularly resonant gas to produce a second series of pulses, means for producing a unidirectional control voltage varying in sense and magnitude with change in the phase relation of said pulses, means for applying said control voltage to stabilize the operating frequency of said microwave oscillator at frequencies respectively corresponding with the frequency of said standard plus or minus a predetermined fixed frequency, a cavity structure broadly resonant at one only of said operating frequencies, means for impressing the output of said oscillator on said cavity structure, and means for suspending application of said control voltage to said microwave oscillator except when the operating frequency is within the range of broad resonance of said cavity structure.

References Cited in the file of this patent

UNITED STATES PATENTS

| | | |
|---|---|---|
| 2,265,796 | Boersch | Dec. 9, 1941 |
| 2,284,266 | De Bellescize | May 26, 1942 |
| 2,287,925 | White | June 30, 1942 |
| 2,396,688 | Crosby | Mar. 19, 1946 |
| 2,410,817 | Ginzton | Nov. 12, 1946 |
| 2,425,922 | Crosby | Aug. 19, 1947 |
| 2,452,575 | Kenny | Nov. 2, 1948 |
| 2,462,856 | Ginzton | Mar. 1, 1949 |
| 2,547,890 | Rubin | Apr. 3, 1951 |
| 2,555,131 | Hershberger | May 29, 1951 |